United States Patent [19]
Cameron

[11] Patent Number: 5,174,126
[45] Date of Patent: Dec. 29, 1992

[54] AIR CONDITIONING SYSTEM

[76] Inventor: Charles Cameron, 235 N. Church, Bensenville, Ill. 60106

[21] Appl. No.: 788,888

[22] Filed: Nov. 7, 1991

Related U.S. Application Data

[63] Continuation-in-part of Ser. No. 611,092, Nov. 9, 1990, Pat. No. 5,092,135.

[51] Int. Cl.$^5$ .............................................. F25B 19/00
[52] U.S. Cl. ...................................................... 62/270
[58] Field of Search ........................... 62/100, 268, 270

[56] References Cited

U.S. PATENT DOCUMENTS

| | | | |
|---|---|---|---|
| 3,604,217 | 9/1971 | Spear | 62/100 X |
| 4,015,439 | 4/1977 | Stern | 62/114 |
| 4,120,172 | 10/1978 | Pierce | 62/115 |
| 4,204,408 | 5/1980 | Dawson | 62/268 X |
| 4,295,342 | 10/1981 | Parro | 62/119 |
| 4,694,658 | 9/1987 | Jahola | 62/100 |

FOREIGN PATENT DOCUMENTS

0150014  7/1985  European Pat. Off. .

*Primary Examiner*—William E. Tapolcai
*Attorney, Agent, or Firm*—Armstrong & Kubovcik

[57] ABSTRACT

An air conditioning system which uses the high dielectric constant of water and inverse pressure to adapt the evaporator and condenser cycles of a conventional air conditioning system to use water instead of freon. The energy-intensive compressor of the conventional system is replaced by pumps which use pressures to effect the vaporization and condensation cycles. Unlike other water-based systems, all atmospheric high kinetic energy gases such as nitrogen and oxygen are excluded from the closed cycles to prevent interference with the polar attractions between the condensing vapor molecules. The air conditioning system is also adapted for use in removing water vapor from gas such as air. The system comprises a passage for the flow of gas therethrough, a fan or the like for causing a flow of air through the passage and at least one porous structure composed at least in part of solid desiccating material located within the flow passage. The structure is hollow such that the interior has an open space communicating with the exterior of the flow passage. The system further includes a pump for creating at least a partial vacuum within the hollow interior of the desiccating structure such that water removed from the gas by the desiccating material is removed from the structure.

18 Claims, 4 Drawing Sheets

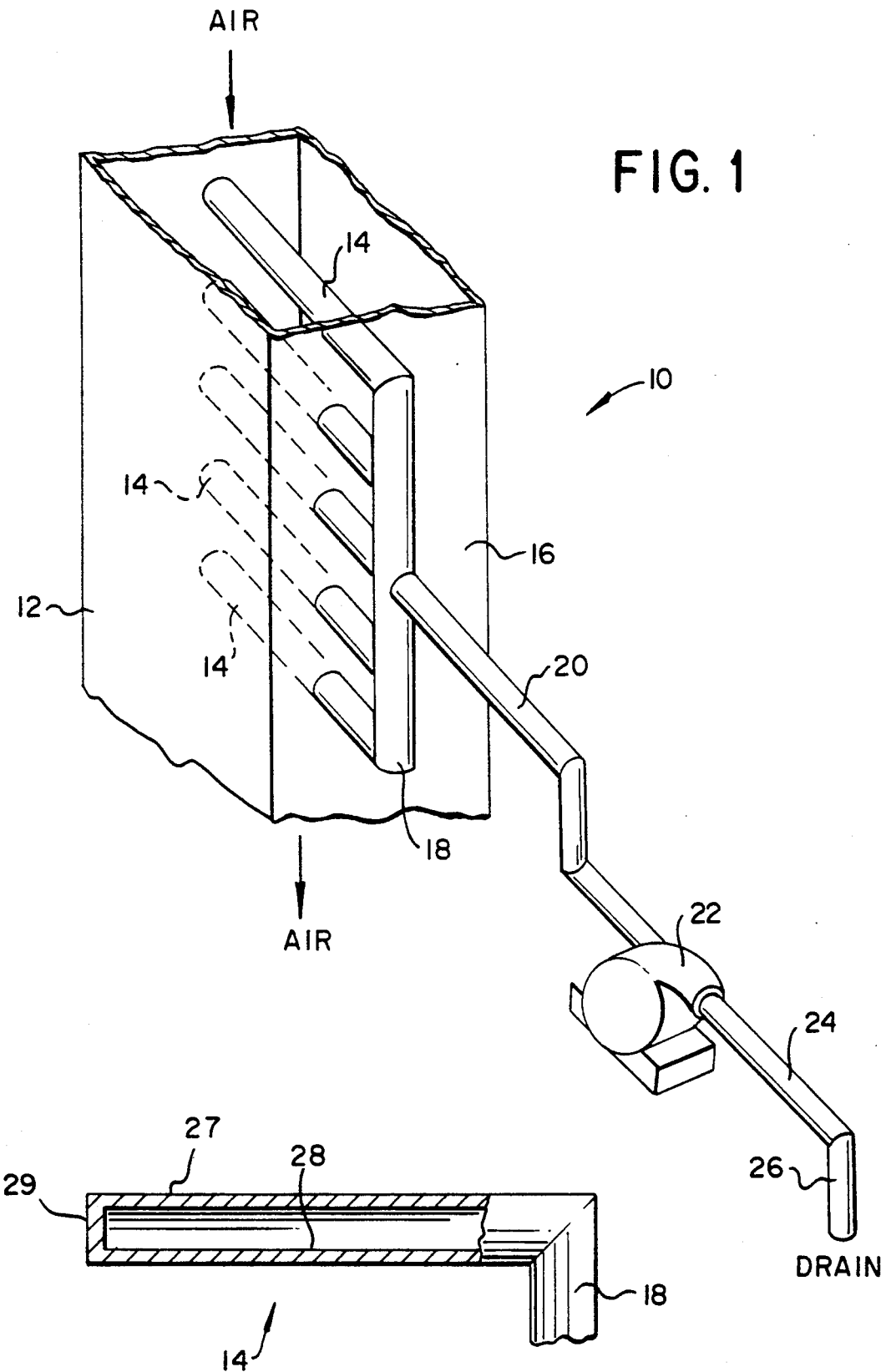

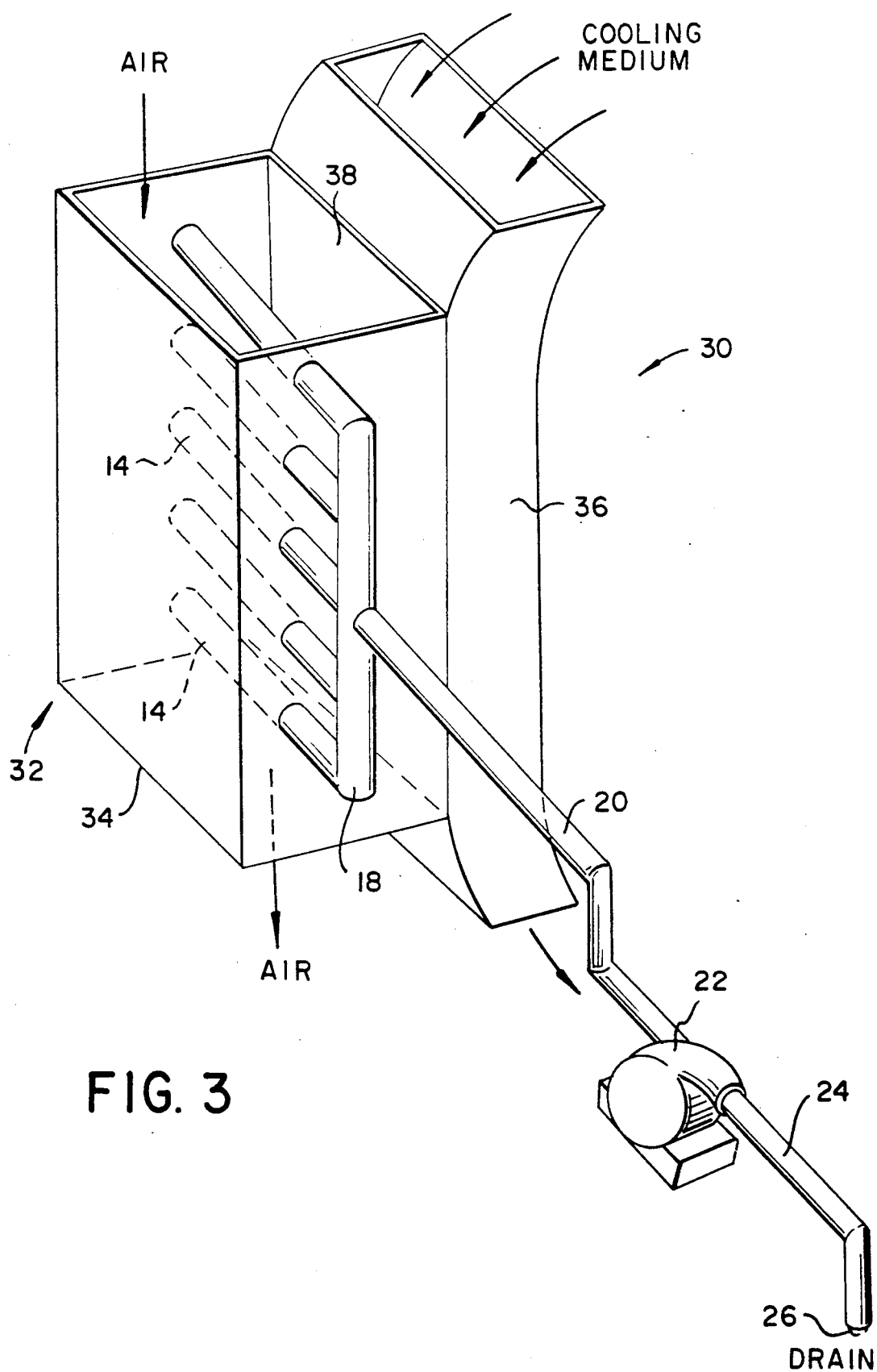

AIR CONDITIONING SYSTEM

This application is a continuation-in-part application of U.S. application Ser. No. 611,092, filed Nov. 6, 1990, now U.S. Pat. No. 5,092,135.

BACKGROUND OF THE INVENTION

The present invention generally relates to fluid conditioning systems, and more particularly, to systems for cooling air and other fluids as well as to systems for removing humidity from air and simultaneously cooling of the dehumidified air for use in rooms, residences and commercial buildings where the system includes solid desiccating structures for humidity removal, the structures being continuously regenerated by a vacuum source.

While the systems of the present invention will be primarily discussed hereinafter with reference to their use in conjunction with the cooling and dehumidification of air, it should be recognized that their use and application are not thereby so limited. For example, the systems may be utilized in the cooling and dehumidification of other gaseous streams such as chemical process streams, natural gas flows and the like.

Heating, ventilation and cooling systems (commonly termed HVAC systems) are conventionally used in commercial and residential buildings and the like to condition the air within the building to a desired temperature and preferably to an optimal humidity. HVAC systems typically comprise a air handling unit which includes means for heating the air such as a furnace or the like, an evaporator connected to an exterior condenser unit which utilizes a compressed fluid such as a halohydrocarbon and a duct for connecting the heating means to the evaporator. In operation, a fan draws air from a return vent within the building and forces the air past the heating means and a coil of the evaporator. In a cooling mode of the system, the air is cooled as it passes over the evaporator coil and in a heating mode, the air is heated as it passes in heat exchange relationship with the heating means.

In conventional air conditioning systems used alone or in combination with heating means as in the above-described system, the condensing unit is located outside of the building to condense a working fluid contained in the system. Heat generated during the compression of the fluid is released to the atmosphere and the high pressure fluid is then conducted to the coil of the evaporator where it is expanded and thereby cooled. Air flowing past the evaporator coil is cooled by heat exchange with the working fluid. During cooling, humidity contained in the air tends to condense on the exterior surface of the evaporator coil and is collected and carried away to a drain or a point exterior to the building.

Several disadvantages are inherent with such systems, particularly in regard to the cooling portion of the system. As mentioned above, the working fluid for the cooling portion of a system is conventially a halohydrocarbon fluid such as those fluids sold under the trade name Freon. Such halohydrocarbon fluids, while generally functioning quite satisfactorily, have been linked to degradation of portions of the environment, particularly the ozone layer, when released into the atmosphere. In addition, such systems tend to be quite large and require significant amounts of energy for operation.

Furthermore such systems may not remove humidity contained in the air to the desired or optimal degree. Depending upon the residence contact time with the evaporator coil, the temperature of the coils and the amounts of humidity contained in the air among other factors, the conditioned air exiting from the system may contain excess humidity for optimum comfort within the building. It has been proposed that such systems and other air conditioning systems include solid or liquid desiccating material as a means for controlling humidity in the air. While such systems do tend to remove some of the humidity from the air satisfactorily, the desiccating material must be regenerated on the periodic basis, generally by evaporating the contained water by the application of heat to the material. As is apparent, the regeneration step for the desiccating material significantly adds to the energy costs associated with the operation of the air conditioning system.

SUMMARY OF THE INVENTION

It is therefore a feature of the present invention to provide an air conditioning system adapted for the removal of humidity from air by the use of desiccating material in the form of hollow structures.

It is also a feature of the present invention to provide an air conditioning device which utilizes a desiccant material for removal of humidity and does not require regeneration by the application of heat to the desiccant material.

It is a further feature of the present invention to provide an air conditioning system which utilizes a desiccant material for removal of humidity, the material being continuously regenerated by the application of a vacuum to the desiccant material.

It is another particular feature of the subject invention to provide an air conditioning system which utilizes hollow porous structures of molecular sieve type desiccant material containing transition metal elements for removal of humidity from an air stream.

It is also a feature of the present invention to provide an air conditioning device which utilizes a desiccant material for removal of humidity and in addition provides air cooling by heat exchange with cooled vapor generated by the application of a vacuum to liquid cooling medium.

It is further feature of the present invention to provide a cooling system such as an air conditioning system which, in a closed system containing essentially liquid water and water vapor, operates at a reduced or subatmospheric pressure using one or more vacuum pumps.

It is a further feature of the present invention to provide an air conditioning system which is able to operated with relatively low amounts of energy and thus low operational costs.

It is another feature of the present invention to provide an air conditioning system which can be easily and simply constructed from relatively inexpensive components to thereby provide an operational system of a relatively low cost.

Briefly, in its broader aspects, the present invention comprehends a cooling system adapted for use in cooling a fluid, the system being a system closed to the external atmosphere and containing a cooling medium consisting essentially of liquid water and water vapor, the system comprising a first receptacle adapted to contain a quantity of liquid water, a first vacuum pump for creating a partial vacuum over the receptacle and creating cooled water vapor, a second vacuum pump for causing the water vapor from the first receptacle to flow through an enclosure for heat exchange therewith, a second receptacle for condensation of the water vapor after passage through the enclosure, and a storage receptacle adapted for heat exchange with another fluid and the water contained in the system, and means for transferring water from the second receptacle to the storage receptacle, the storage receptacle being in communication with the first receptacle.

The present invention further comprehends an air conditioning system adapted for use in cooling air, the system comprising a passage for the flow of air therethrough, means for causing a flow of air through the passage, and means for cooling the passage so as to cool the flow of air within the passage, said means for cooling being a closed system comprising a first receptacle adapted to contain a quantity of liquid water, means for creating a partial vacuum over the receptacle and creating cooled water vapor, an enclosure in heat exchange relationship with the passage and which is adapted to contain a flow of cooled water vapor, means for causing the water vapor from the first receptacle to flow through the enclosure, a second receptacle for condensation of the water vapor after passage through the enclosure, and a storage receptacle adapted for heat exchange with another fluid and the water, and means for transferring water from the second receptacle to the storage receptacle, the storage receptacle being in communication with the first receptacle system adapted for use in removing water vapor from air and for cooling the air, the system comprising a passage for the flow of air therethrough, means for causing a flow of air through the passage, at least one porous structure composed at least in part of solid desiccating material located within the flow passage, the structure being hollow such that the interior has an open space communicating with the exterior of the flow passage, and means for creating at least a partial vacuum within the interior of the desiccating structure such that water removed from the air by the desiccating material is removed from the structure, and means for cooling the exterior of the passage so as to cool the flow of air.

The present invention also comprehends an air conditioning system adapted for use in removing water vapor from air and for cooling the air, the system comprising a passage for the flow of air therethrough, means for causing a flow of air through the passage, at least one porous structure composed at least in part of solid desiccating material located with the flow passage, the structure being hollow such that the interior has an open space communicating with the exterior of the flow passage, and means for creating at least a partial vacuum within the interior of the desiccating material is removed from the structures, and means for cooling the exterior of the passage so as to cool the flow of air within the passage, said means for cooling being a closed system comprising a first receptacle adapted to contain a quantity of liquid water, means for creating a partial vacuum over the receptacle and creating cooled water vapor, an enclosure in heat exchange relationship with the passage and which is adapted to contain a flow of cooled water vapor, means for causing the water vapor from the first receptacle to flow through the enclosure, a second receptacle for condensation of the water vapor after passage through the enclosure, and a storage receptacle adapted for heat exchange with another fluid and the water, and means for transferring water from the second receptacle to the storage receptacle, the storage receptacle being in communication with the first receptacle.

The present invention further comprehends an air conditioning system which includes evaporator and condenser cycles designed to utilize the high dielectric constant of water, specifically the hydrogen bonding and the oxygen polarities of the water molecules, by substituting water for freon in both evaporator and condenser cycles and uses pumps and inverse pressures in the closed system cycles with no other materials or gases other than the phases of water, a system quite different than a phase where water vapor is buffered by about 98% nitrogen and oxygen with high kinetic energies such as the atmosphere. Thus, the subject systems are closed systems and exclude all other gases such as oxygen and/or nitrogen, e.g., air from the cycles which helps prevent interference with polar attraction between condensing water vapor molecules. In the subject system, water vapor condenses when it is pumped into the condenser and the forces of attraction between the molecules exceed the forces of repulsion while the pressure/temperature relationship is less than the boiling point.

The systems of the present invention use water as the ideal refrigerant since a) it has a phase conversion factor more than four times that of freon, i.e., 1600:1 vs. 350:1 for freon, which is an indication of its greater latent energy capacity as absorbed by its electrons as according to the features of quantum mechanics; b) the dielectric attractions of water promote self-condensation (in chemistry this regard is a "downhill" process as compared to the "uphill" freon process which requires energy input via high compression), and c) a water cycle does not require the input of counter-productive heat such as is produced in freon by the thermodynamics of the high compression.

The systems of the present invention further capitalize on other distinct benefits from the use of water as the refrigerant due to: a) the mass of a water molecule is less than 20% of the mass of a freon molecule; b) the motor which drives the pumps of the invention consumes less than 20% of the energy required for the freon compressor motor, and c) the cooling surface fin area of a freon unit is less than 20% of the cooling surface of the invention throughput.

The inverse pressure used in the evaporator, the dielectric constant of water condenser and the inverse pressure humidity exhaust techniques of this system are particularly suitable for multi-cooling expansion. Because pressure automatically equalizes within a closed system, one humidity exhaust will service a single evaporator or a series of evaporator modules. Similarly, one vapor-only condenser system will service a single evaporator or a series of evaporator modules. The closed system condenser module can be enlarged or adapted to perform heat exchange with the external air, a cooling tower, a heat pump, a geothermal process or other methods. Energy saving of up to 50% or more are attainable for the single evaporator non-compressor system and much greater saving are attainable by multi-module configurations.

Thus, in summary, the air conditioning systems of the invention use the high dielectric constant of water and inverse subatmospheric pressure to adapt the evaporator and condenser cycles of a conventional air conditioning system to use water and water vapor instead of freon. The energy-intensive compressor of the conventional system is replaced by pumps which use pressures to effect the vaporization and condensation cycles of the water. Unlike other water-based systems, all atmospheric high kinetic energy gases such as nitrogen and oxygen e.g., air, are excluded from the closed cycles to prevent interference with the polar attractions between the condensing vapor molecules.

Further features, objects and advantages of the present invention will become more fully apparent from a detailed consideration of the arrangement and construction of the constituent parts as set forth in the following description when taken together with the accompanying drawings.

BRIEF DESCRIPTION OF THE DRAWINGS

In the drawings,

FIG. 1 is a perspective schematic type view of an air conditioning system embodying one aspect of the principles of the present invention, FIG. 2 is a cross-sectional view of a hollow desiccant structure used in the system shown in FIG. 1, FIG. 3 is a schematic type view of another embodiment of an air conditioning system which is a modification of the embodiment shown in FIG. 1.

DETAILED DESCRIPTION OF THE PREFERRED EMBODIMENTS

Figure 4:
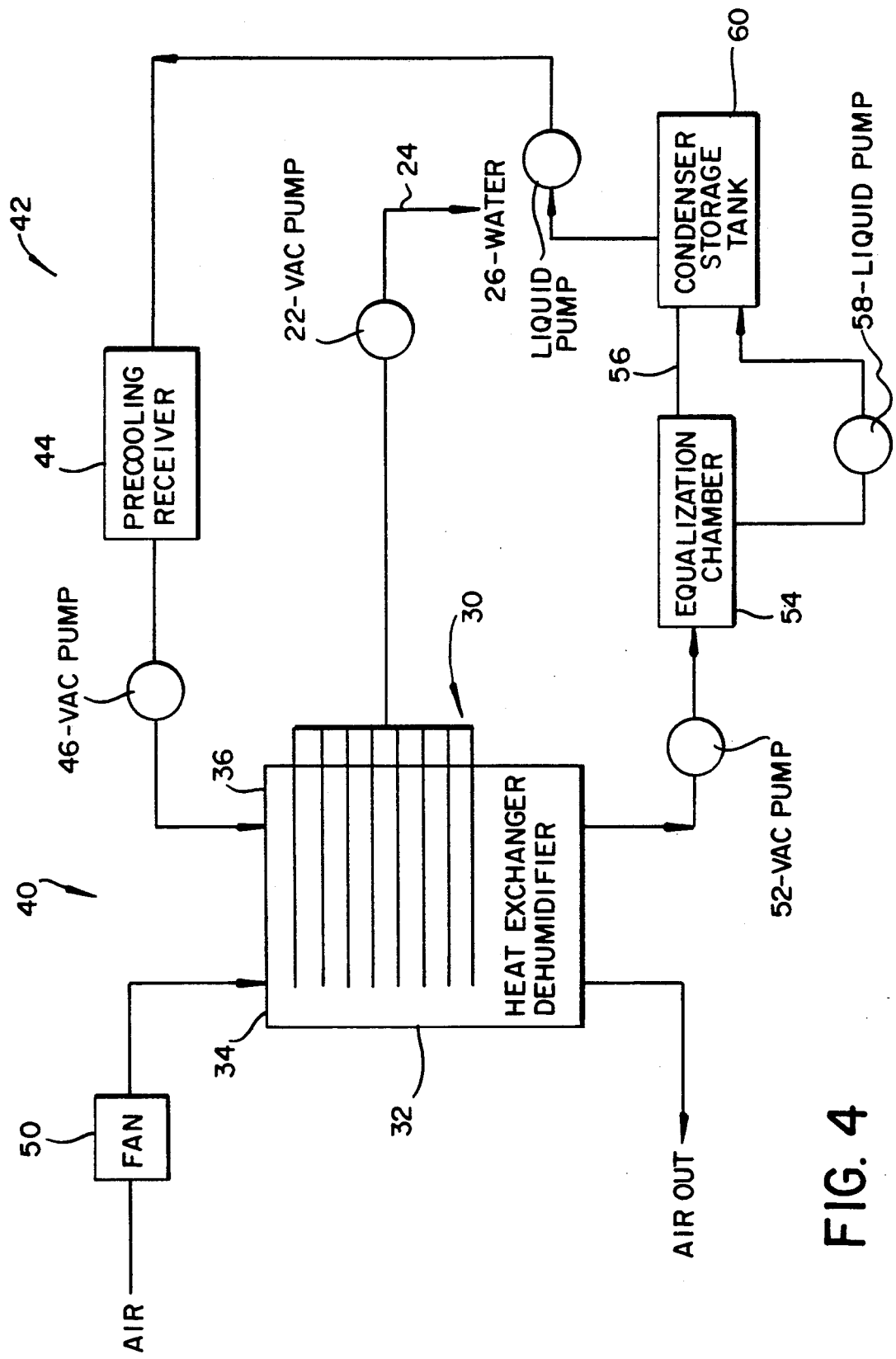
FIG. 4 is a schematic type view of another more specific embodiment of the air conditioning system shown in FIG. 3 where cooling medium for the dehumidification unit is produced by system employing a non-halogen containing type liquid.

Turning first to FIG. 1, shown is a perspective view of one embodiment of air conditioning system 10 according to the present invention, the system being particularly adaptable for the dehumidification of ambient air for use in applications such as conditioning air for residential and commercial buildings. In this embodiment, system 10 comprises passageway 12 shown in the form of a duct which is oriented vertically. Passageway 12 may of course take other shapes such as circular and the like and may be oriented in basically any direction. Passageway 12 is adapted to contain a flow of a gas such as air as indicated by the arrows while the gas is being dehumidified by system 10.

Contained with passageway 12 are a plurality of hollow structures 14 in the shape of tubes which are formed at least in part of desiccant material. Hollow structures 14 are oriented in a plane relative to each other and extend transverse to the flow of air through passageway 12. One end of each of hollow structures 14 can be closed, the opposed distal portions of each of the hollow structures from the optional closed end extending through wall 16 of passageway 12 and communicating with common manifold 18 located on the exterior of passageway 12. Pipe 20 extends from manifold 18 to vacuum pump 22, the outlet pipe 24 of which terminates in water drain 26.

As is best shown in FIG. 2, hollow structures 14 each comprise a circular wall 27 defining an open volume 28 and having one end closed by end wall 29. The walls 27 and 29 contain desiccant material capable of absorbing water vapor and have a degree of porosity such that water is able to flow therethrough. Particularly suitable materials for forming hollow structures 14 include silica based materials such as molecular sieve type materials composed primarily of crystalline silica optionally containing conducting metals and catalysts such as transition metals including Fe, Co, Pd and Mn, particularly Mn and Ni, and most particularly Ni, generally from about one to about thirty weight percent, preferably about ten to twenty percent. Hollow structures in addition may be composites of various desiccant materials as well as various materials formed into contiguous layers or even commingled or mixed together into a suitable composite mass. In addition, the construction of wall 27 for each structure may contain a structural support such as wire mesh, wire and the like either embedded in the structure or in close proximity thereto.

A particularly preferred composition for forming the desiccant material of the hollow structures 14 includes about 60 percent or more silica, about 10 percent coke, about 20 percent nickel and about 10 percent manganese dioxide, all percentages by weight. Water tends to be absorbed into the pores of the ionic sintered molecular sieve silica component and the surrogate catalystic manganese dioxide and nickel components facilitate the flow of water. Both metal components provide thermal conductivity for the structure and the coke is included for ease of forming the structures, particularly when the structures are formed by casting and the like as well as for increasing porosity.

One presently preferred method for construction of hollow structures 14 is by forming or pressing powders of suitable constituents including appropriate binders such as polymeric resins into the requisite hollow tubular shape by use of steel mandrel or the like and then subjecting the powders to an elevated temperature so as to sinter the powders into a coherent, porous structure. Consumable organic fillers such as resins and wood flour may be incorporated int the initial material to provide increased porosity after sintering. The resultant hollow structures may be in the form of a molecular sieve and have internal surface areas much greater than the external surface area.

In operation of the embodiment of the system shown in FIG. 1, a gas such as air containing unwanted or undesirable humidity is caused to enter passageway 12 by suitable means such as a fan or the like (not shown) and to pass through the passageway and successively contact hollow structure 14. During contact with the hollow structures 14, the molecule are sieve type desiccant material contained in the structures cold traps and absorbs water contained in the gas thereby dehumidifying the gas. A partial vacuum in the interior of hollow structures 14 created by vacuum pump 22 draws water in both liquid and gaseous form from the desiccant material and exhausts the water through pipe 2 to drain 26. In this manner, the desiccant material in hollow structures 14 is continuously regenerated for withdrawing further moisture from the gas passing through passageway 12.

Turning now to FIG. 3, shown is a modified from of the system 10 shown in FIG. 1, the same numerals being used for common elements in illustrated system 30. In this embodiment, passageway 32 of system 30 is constructed such that a cooling medium can flow either concurrently or counter currently in heat exchange relationship with the air being dehumidified. Passageway 32 includes first and second passages 34 and 36 separated by a thermal conductive gas barrier such as the common wall 38 shown. Operation of the system shown is similar to that of the system of FIG. 1 with air flowing through first passage 34 being dehumidified by contact with hollow structures 14. In addition, the flow of air in passage 34 is cooled by contact with common wall 38 which is in turn cooled by a flow of cooling medium through second passage 35.

FIG. 4 is a schematic in the form of a flow diagram of a particularly preferred embodiment of an air conditioning system according to the invention. System 40 includes heat exchange-dehumidifier system 30 as shown in FIG. 3 in conjunction with cooling system 42. Cooling system 42 produces a cooling medium from a non-halogen containing fluid such as water alone or water containing various alcohols such as methanol and ethanol which are completely miscible therein and the system uses reduced pressures, that is, pressures generally below atmospheric pressure in its operation. A particularly preferred non-halogen containing fluid for the operation of cooling system 42 of the present invention is distilled water which may optionally include a small but significant amount, less than ten per cent for example, of denatured methanol as an antifreeze or as an antibacterial agent.

Cooling system 42 comprises precooling receiver or storage tank 44 partially full of cooling medium and having a vapor space thereover. Communicating with the vapor space is vacuum pump 46 which draws water vapor and liquid water from precooling receiver 44 by creating a reduced pressure (subatmospheric pressure) of, for example, about 8 psig, over the liquid cooling medium. The combined flow stream from evaporator vacuum pump 46 then passes to second passage 36 of passageway 32 (see FIG. 3) for the cooling humidity laden air forced through first passage 34 by fan 50. The combined stream of vapor and liquid is drawn from second passage 36 by second vacuum pump 52 and then passes to equilibrium chamber 54 which communicates with condenser tank 60 by line 56 for passage of vapor therethrough. Cooling medium or liquid condensed in equilibrium chamber 54 is transferred by pump 58 to condenser tank 60 where it is pumped to precooling receiver 44. Liquid and vapor in equalization or equilibrium tank 54 and condenser tank 60 preferably are thermally isolated from the remainder of cooling system 42 and perform heat exchange with the external atmosphere by, for example, the tank being in the form of metal tanks of relatively thin walls which are surrounded by and in contact with the external atmosphere for heat exchange purposes.

As air passes through passages 34 of passageway 32, humidity contained in the air is removed therefrom by hollow structures 14 containing porous desiccant material. Cooling provided by cooling medium of system 42 also aids in the dehumidification of the air by promoting condensation. Vacuum pump 22 withdraws vaporized water from the hollow structures 14 and passes the water through pipe 24 and to drain 26.

Figure 5:
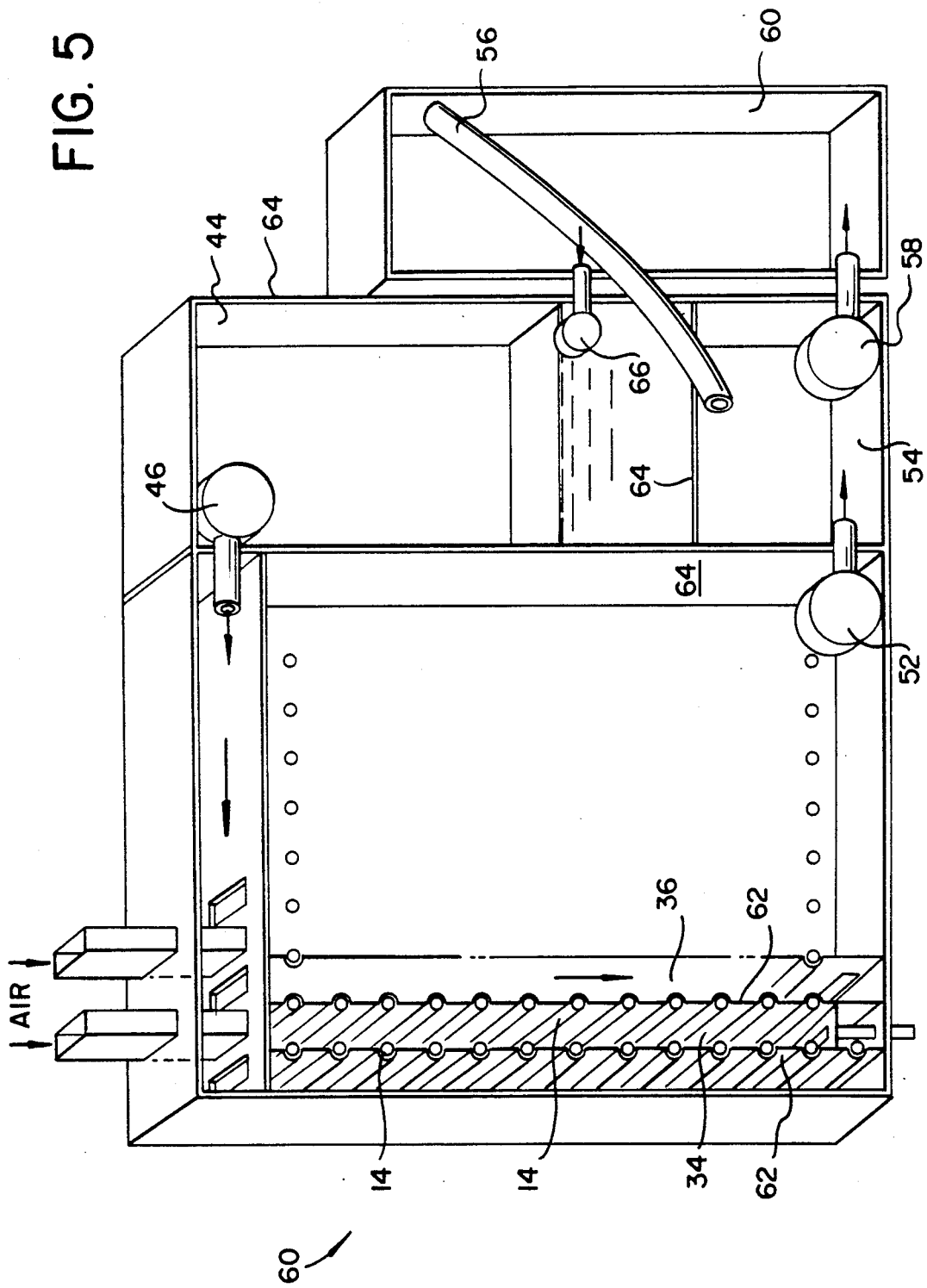
FIG. 5 is a schematic type view of a specific embodiment of the air conditioning system shown in FIG. 3 where cooling medium for the dehumidification unit is produced by system employing a non-halogen containing type liquid.

FIG. 5 illustrates a particularly preferred embodiment of the system 40 of FIG. 4. Evaporator cooling chamber 60 basically comprises a plurality of passageways arranged in parallel for treatment of greater flow quantities of air. As in shown, walls 62 between passages 34 and 36 have a rippled or wavy cross-section extending horizontally from greater gas contact due to the turbulence created by the ripple wall contours In drawing only two of the walls 62 are shown for the sake of simplicity although it should be realized that a plurality of walls are used in this embodiment. In addition, hollow structures 14 are positioned horizontally so as to be partially within the rippled portion of the heat exchanging barrier walls 62 so as to take advantage of the turbulent flow created therein. Second vacuum pump 52 is located within the confines of the passages 36.

In the embodiment shown in FIG. 5, passages 34 and 36 and precooling receiver 44 as well as first vacuum pump 46 are surrounded by insulating walls 64 so as to help prevent heat from entering the system from the external environment. In contrast, equalization tank 54 is exterior to the insulated walls 64 such that the contents of the equalization tank are freely able to exchange heat with the external atmosphere. Also external to the insulated walls is condenser tank 60 which receives liquid pumped from equalization tank 54 by liquid pump 58 thereby providing additional heat exchange for the contained liquid with the external atmosphere. Extending between condenser tank 60 and precooling precooling receiver 44 is valve/spray 66 controlled by a float contained in the precooling receiver which maintains a sufficient level of liquid in the receiver.

In operation of the preferred embodiment as shown in FIG. 5, first vacuum pump 46 is of a size and power sufficient to maintain a reduced pressure such as, for example, about 10 psig in the vapor space within precooling receiver 44. Evaporation of the liquid cooling medium in the receiver due to the reduced pressure thereby cools the liquid and resultant vapor which is brought into heat exchange relationship with the outside air in passages 34. The external air is thereby cooled which also aids in its dehumidification by hollow structures 14. Second vacuum pump 52 contributes to the cooling of the vapor in passages by maintaining a reduced pressure of, for example, about 8 psig in the passages 36. The vapor in passage 36 is exhausted to equalization tank 54 and condenser tank 60 and the resulting space is constantly filled with water vapor from precooling receiver 44 by pumps 46.

As is apparent to those of skill in the art to which the present invention pertains, an air conditioning system according to the present invention provides many significant advantages in the removal of humidity from gaseous streams such as air. Among others, the air conditioning system removes humidity and heat from the air by using a low pressure desiccating technique which does not require a desorbing step involving the use of heat for regeneration of the desiccating material Thus the removal of moisture from the air is inexpensively and automatically accomplished. Also in this regard, the system utilizes pressures which thereby substantially reduces energy costs.

Furthermore, the air conditioning system of the invention need not utilize a halohydrocarbon type cooling purposes thus minimizing adverse environmental effects associated with such a medium. In addition, the operation of the air conditioning system without a Freon type system eliminates the rapid process air conditioning cycle which does not allow sufficient heat adsorption time in the evaporative phase and thereby returns the gas to the compressor without using up to 80% or more of its cooling potential. The subject system also eliminates the high freon compression which is a very counter-productive cycle by conventing electrical energy to heat input, entropy, in the gas and thereby adding to the heat load which must be removed from the freon.

Also, the construction of the heat exchange surfaces of the air conditioning system where the hollow desiccant structures are located within indentation of the cooling surfaces tends to increase the cooling surface interface with the air flow and thereby permits a greater surface area with less boundary layer of laminar air flow.

The subject system further has inexpensive modular expansion features in that the system will function with many additional modules requiring only small remote pumps to service each module connected to the central exhaust system. The condenser tank of the system also represents a modular capacity of serving many attached evaporator cooling modules.

While there has been shown and described what is considered to be preferred embodiment of the present invention, it will be apparent to those skilled in the art to which the invention pertains that various changes and modification may be made therein without departing from the invention as defined in the appended claims.

It is claimed:

1. An air conditioning system adapted for use in cooling air, the system comprising a passage for the flow of air therethrough, means for causing a flow of air through the passage, and means for cooling the passage so as to cool the flow of air within the passage, said means for cooling being a closed system comprising a first receptacle adapted to contain a quantity of liquid water, means for creating a partial vacuum over the receptacle and creating cooled water vapor, an enclosure in heat exchange relationship with the passage and which is adapted to contain a flow of cooled water vapor, means for causing the water vapor from the first receptacle to flow through the enclosure, a second receptacle for condensation of the water vapor after passage through the enclosure, and a storage receptacle adapted for heat exchange with another fluid and the water, and means for transferring water from the second receptacle to the storage receptacle, the storage receptacle being in communication with the first receptacle.

2. An air conditioning system in accordance with claim 1, wherein the means for creating a partial vacuum over the receptacle includes a first vacuum pump.

3. An air conditioning system in accordance with claim 2, wherein the means for causing the vapor to pass through the enclosure include a second vacuum pump.

4. An air conditioning system in accordance with claim 3, wherein the means of transferring water includes a liquid pump in communication with the second receptacle.

5. An air conditioning system in accordance with claim 4 further including at least one porous structure composed at least in part of solid desiccating material located within the flow passage, the structure being hollow such that the interior has an open space communicating with the exterior of the flow passage, and means for creating at least a partial vacuum within the hollow interior of the desiccating structure such that water removed from the gas by the desiccating material is removed from the structure.

6. An air conditioning system in accordance with claim 5, wherein the means for creating at least a partial vacuum within the structure includes a vacuum pump in communication with the interior of the structure.

7. An air conditioning system in accordance with claim 6, wherein the porous structure is in the general shape of a tube with the interior of the tube communicating with the exterior of the structure.

8. An air conditioning system in accordance with claim 5, wherein the desiccating material of the structure includes a molecular sieve containing silica.

9. An air conditioning in accordance with claim 8, wherein the desiccating material includes transition metals.

10. An air conditioning system in accordance with claim 5, wherein the interior of the first passage includes indentions and the porous structures are located adjacent to the indentations.

11. An air conditioning system adapted for use in removing water vapor from air and for cooling the air, the system comprising a passage for the flow of air therethrough, means for causing a flow of air through the passage, at least one porous structure composed at least in part of solid desiccating material located with the flow passage, the structure being hollow such that the interior has an open space communicating with the exterior of the flow passage, and means for creating at least a partial vacuum within the interior of the desiccating material is removed from the structures, and means for cooling the exterior of the passage so as to cool the flow of air within the passage, said means for cooling being a closed system comprising a first receptacle adapted to contain a quantity of liquid water, means for creating a partial vacuum over the receptacle and creating cooled water vapor, an enclosure in heat exchange relationship with the passage and which is adapted to contain a flow of cooled water vapor, means for causing the water vapor from the first receptacle to flow through the enclosure, a second receptacle for condensation of the water vapor after passage through the enclosure, and a storage receptacle adapted for heat exchange with another fluid and the water, and means for transferring water from the second receptacle to the storage receptacle, the storage receptacle being in communication with the first receptacle.

12. An air conditioning system in accordance with claim 1, wherein the means for creating a partial vacuum over the receptacle includes a first vacuum pump.

13. An air conditioning system in accordance with claim 11, wherein the means for causing the vapor to pass through the enclosure include a second vacuum pump.

14. An air conditioning system in accordance with claim 11, wherein the means of transferring water includes a liquid pump in communication with the second receptacle.

15. An air conditioning system in accordance with claim 14, further including a second liquid pump for transferring liquid from the storage receptacle to the first receptacle.

16. A cooling system adapted for use in cooling a fluid, the system being a system closed to the external atmosphere and containing a cooling medium consisting essentially of liquid water and water vapor, the system comprising a first receptacle adapted to contain a quantity of liquid water, a first vacuum pump for creating a partial vacuum over the receptacle and creating cooled water vapor, a second vacuum pump for causing the water vapor from the first receptacle to flow through an enclosure for heat exchange therewith, a second receptacle for condensation of the water vapor after passage through the enclosure, and a storage receptacle adapted for heat exchange with another fluid and the water contained in the system, and means for transferring water from the second receptacle to the storage receptacle, the storage receptacle being in communication with the first receptacle.

17. A cooling system in accordance with claim 16, wherein the means of transferring water includes a liquid pump in communication with the second receptacle and the storage receptacle.

18. A cooling system in accordance with claim 17 further including a second liquid pump for transferring liquid from the storage receptacle to the first receptacle.

* * * * *